United States Patent
Reimann (10) Patent No.: US 12,120,589 B2
(45) Date of Patent: Oct. 15, 2024

(54) METHOD FOR PREDICTING CHANNEL LOAD

(71) Applicant: VOLKSWAGEN AKTIENGESELLSCHAFT, Wolfsburg (DE)

(72) Inventor: Daniel Reimann, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 316 days.

(21) Appl. No.: 17/429,258

(22) PCT Filed: Feb. 18, 2020

(86) PCT No.: PCT/EP2020/054180
§ 371 (c)(1),
(2) Date: Aug. 6, 2021

(87) PCT Pub. No.: WO2020/169569
PCT Pub. Date: Aug. 27, 2020

(65) Prior Publication Data
US 2022/0130236 A1   Apr. 28, 2022

(30) Foreign Application Priority Data

Feb. 20, 2019 (EP) .................................. 19158381
Apr. 29, 2019 (EP) .................................. 19171569
Jan. 16, 2020 (EP) .................................. 20152152

(51) Int. Cl.
*H04W 4/46* (2018.01)
*G08G 1/01* (2006.01)
(Continued)

(52) U.S. Cl.
CPC ............ *H04W 4/46* (2018.02); *G08G 1/0112* (2013.01); *G08G 1/0125* (2013.01);
(Continued)

(58) Field of Classification Search
CPC ....... H04W 4/46; H04W 4/023; H04W 4/027; H04W 4/40; H04W 16/28; H04W 24/08;
(Continued)

(56) References Cited

U.S. PATENT DOCUMENTS 5,812,069 A   9/1998  Albrecht et al.
7,546,182 B2  6/2009  Mudalige
(Continued)

FOREIGN PATENT DOCUMENTS

CN   101031161 A   9/2007
CN   101228566 A   7/2008
(Continued)

OTHER PUBLICATIONS

Second Office Action; Chinese Patent Application No. 202080015764. 1; dated Aug. 30, 2023.
(Continued)

*Primary Examiner* — Behrang Badii
(74) *Attorney, Agent, or Firm* — Barnes & Thornburg LLP (57) ABSTRACT

A method for predicting channel load. The method includes determining a first channel quality information (CQI) associated with a location and a first time point, predicting traffic flow data associated with the location and a second time point subsequent to the first time point, predicting a second CQI associated with the location and the second time point based on the first CQI and the predicted traffic flow, and selectively transmitting a message comprising the second CQI, the location, and the second time point to at least one transportation vehicle based on the second CQI. Also disclosed is a transportation vehicle and a road side unit (RSU) for performing the method.

15 Claims, 2 Drawing Sheets

(51) Int. Cl.

| | | |
|---|---|---|
| *G08G 1/056* | (2006.01) | |
| *H04B 7/0413* | (2017.01) | |
| *H04B 7/06* | (2006.01) | |
| *H04B 7/08* | (2006.01) | |
| *H04B 17/373* | (2015.01) | |
| *H04L 1/00* | (2006.01) | |
| *H04L 43/0882* | (2022.01) | |
| *H04L 47/127* | (2022.01) | |
| *H04W 4/02* | (2018.01) | |
| *H04W 4/40* | (2018.01) | |
| *H04W 16/28* | (2009.01) | |
| *H04W 24/08* | (2009.01) | |
| *H04W 24/10* | (2009.01) | |
| *H04W 28/02* | (2009.01) | |
| *H04W 64/00* | (2009.01) | |
| *H04W 72/542* | (2023.01) | |

(52) U.S. Cl.
CPC ............ *G08G 1/0145* (2013.01); *G08G 1/056* (2013.01); *H04B 7/0413* (2013.01); *H04B 7/0626* (2013.01); *H04B 7/086* (2013.01); *H04B 17/373* (2015.01); *H04L 1/0026* (2013.01); *H04L 43/0882* (2013.01); *H04L 47/127* (2013.01); *H04W 4/023* (2013.01); *H04W 4/027* (2013.01); *H04W 4/40* (2018.02); *H04W 16/28* (2013.01); *H04W 24/08* (2013.01); *H04W 24/10* (2013.01); *H04W 28/0273* (2013.01); *H04W 28/0284* (2013.01); *H04W 64/006* (2013.01); *H04W 72/542* (2023.01)

(58) Field of Classification Search
CPC ............. H04W 24/10; H04W 28/0273; H04W 28/0284; H04W 64/006; H04W 72/542; H04W 28/0268; H04W 4/02; H04W 4/021; H04W 4/44; H04W 72/02; H04W 24/06; H04W 4/025; G08G 1/0112; G08G 1/0125; G08G 1/0145; G08G 1/056; G08G 1/096708; G08G 1/096741; G08G 1/096791; G08G 1/163; H04B 7/0413; H04B 7/0626; H04B 7/086; H04B 17/373; H04B 17/318; H04L 1/0026; H04L 43/0882; H04L 47/127; H04L 1/0033; H04L 1/0036
See application file for complete search history.

(56) References Cited

U.S. PATENT DOCUMENTS

| | | | |
|---|---|---|---|
| 7,940,741 B2 | 5/2011 | Lee et al. | |
| 8,917,598 B2 | 12/2014 | Ho et al. | |
| 8,922,390 B2 | 12/2014 | Stahlin et al. | |
| 8,954,567 B1* | 2/2015 | Skvortsov | G06Q 30/0202 709/224 |
| 9,355,563 B2 | 5/2016 | Altintas et al. | |
| 9,392,486 B2 | 7/2016 | Bai et al. | |
| 9,456,379 B2 | 9/2016 | Sakata | |
| 9,883,354 B2 | 1/2018 | Moebus et al. | |
| 9,888,396 B2 | 2/2018 | Wilhelm et al. | |
| 10,015,289 B2 | 7/2018 | Bosch et al. | |
| 10,136,256 B2 | 11/2018 | Godet et al. | |
| 10,154,419 B2 | 12/2018 | Ekiz et al. | |
| 10,380,885 B2 | 8/2019 | Biehle et al. | |
| 10,455,367 B2 | 10/2019 | Calabuig Gaspar et al. | |
| 11,395,298 B2 | 7/2022 | Kang et al. | |
| 2012/0003921 A1 | 1/2012 | Scopigno et al. | |
| 2013/0035083 A1 | 2/2013 | Kadel | |
| 2014/0092735 A1 | 4/2014 | Lee et al. | |
| 2015/0032289 A1 | 1/2015 | Lotz et al. | |
| 2016/0321919 A1 | 11/2016 | Xu et al. | |
| 2017/0041760 A1 | 2/2017 | Alieiev et al. | |
| 2017/0116852 A1 | 4/2017 | Xu et al. | |
| 2018/0082586 A1* | 3/2018 | Sengupta | H04W 4/029 |
| 2018/0276988 A1 | 9/2018 | Littlejohn | |
| 2018/0295474 A1 | 10/2018 | Lee et al. | |
| 2018/0359713 A1 | 12/2018 | Boban et al. | |
| 2019/0012909 A1 | 1/2019 | Mintz | |
| 2019/0039627 A1 | 2/2019 | Yamamoto | |
| 2019/0043347 A1 | 2/2019 | Biehle et al. | |
| 2019/0101404 A1* | 4/2019 | Zhang | G01C 21/3492 |
| 2019/0245647 A1 | 8/2019 | Alieiev et al. | |
| 2019/0335397 A1 | 10/2019 | Ganesan et al. | |
| 2020/0280827 A1 | 9/2020 | Fechtel et al. | |
| 2021/0053570 A1 | 2/2021 | Akella et al. | |
| 2021/0258869 A1 | 8/2021 | Girolamo et al. | |

FOREIGN PATENT DOCUMENTS

| | | |
|---|---|---|
| CN | 102421142 A | 4/2012 |
| CN | 102624896 A | 8/2012 |
| CN | 103125109 A | 5/2013 |
| CN | 103813386 A | 5/2014 |
| CN | 104408921 A | 3/2015 |
| CN | 105023424 A | 11/2015 |
| CN | 105376795 A | 3/2016 |
| CN | 105791143 A | 7/2016 |
| CN | 105824035 A | 8/2016 |
| CN | 106471826 A | 3/2017 |
| CN | 106506386 A | 3/2017 |
| CN | 106657209 A | 5/2017 |
| CN | 106710215 A | 5/2017 |
| CN | 107040959 A | 8/2017 |
| CN | 107071855 A | 8/2017 |
| CN | 107202981 A | 9/2017 |
| CN | 107742420 A | 2/2018 |
| CN | 108028013 A | 5/2018 |
| CN | 108269395 A | 7/2018 |
| DE | 102013207587 A1 | 11/2013 |
| DE | 102014212989 A1 | 1/2016 |
| DE | 102016226050 A1 | 6/2018 |
| DE | 102017108428 A1 | 10/2018 |
| DE | 102017010969 B3 | 2/2019 |
| EP | 0755039 A2 | 1/1997 |
| EP | 3598413 A1 | 1/2020 |
| GB | 2544518 A | 5/2017 |
| JP | H1186197 A | 3/1999 |
| JP | 2005150848 A | 6/2005 |
| JP | 2010103945 A | 5/2010 |
| JP | 2011508539 A | 3/2011 |
| JP | 2015171018 A | 9/2015 |
| JP | 2016015755 A | 1/2016 |
| JP | 2016028541 A | 2/2016 |
| JP | 2017041749 A | 2/2017 |
| JP | 2017175296 A | 9/2017 |
| JP | 2018174594 A | 11/2018 |
| KR | 101506598 B1 | 3/2015 |
| WO | 2017045139 A1 | 3/2017 |
| WO | 2017052690 A1 | 3/2017 |
| WO | 2017133769 A1 | 8/2017 |
| WO | 2018019394 A1 | 2/2018 |
| WO | 2018111177 A1 | 6/2018 |
| WO | 2018190604 A1 | 10/2018 |

OTHER PUBLICATIONS

European Patent Application No. 19158381.4; dated Feb. 20, 2019.
Office Action; Chinese Patent Application No. 202080015764.1; dated Sep. 5, 2022.
Office Action; Japanese Patent Application No. 2021-549151; dated Sep. 6, 2022.
Search Report; European Patent Application No. 20154605.8; dated Apr. 7, 2020.
Search Report; International Patent Application No. PCT/EP2020/054179; dated Apr. 7, 2020.
European Patent Application No. 18184352.5; dated Jul. 19, 2018.
3GPP TSG RAN WG1 Meeting #86bis; Congestion control for V2V; Oct. 10-14, 2016; Lisbon, Portugal.

(56) References Cited

OTHER PUBLICATIONS

Awang et al.; Routing in Vehicular Ad-hoc Networks: A Survey on Single- and Cross-Layer Design Techniques, and Perspectives; IEEE; Special Section on Resource Management in Vehicular Ad-hoc Networks: Energy Management, Communication Protocol and Future Applications; Apr. 7, 2017.
Search Report for European Patent Application No. 20152152.3; dated Apr. 7, 2020.
Search Report for International Patent Application No. PCT/EP2020/054180; dated Apr. 7, 2020.
Office Action; U.S. Appl. No. 17/428,652; dated Mar. 2, 2023.
Office Action; Korean Patent Application No. 10-2021-7029069; Sep. 20, 2023.
Office Action; Chinese Patent Application No. 202080015846.6; Dec. 22, 2023.
Office Action; Japanese Patent Application No. 2021-549149; Jan. 4, 2024.
Office Action; Japanese Patent Application No. 2021-549149; May 21, 2023.

\* cited by examiner

METHOD FOR PREDICTING CHANNEL LOAD

PRIORITY CLAIM

This patent application is a U.S. National Phase of International Patent Application No. PCT/EP02020/054180, filed 18 Feb. 2020, which claims priority to European Patent Application Nos. 19158381.4, filed 20 Feb. 2019; 19171569.7, filed 29 Apr. 2019; and 20152152.3, filed 16 Jan. 2020, the disclosures of which are incorporated herein by reference in their entireties.

SUMMARY

Illustrative embodiments relate to a method for predicting channel load, particularly for predicting channel load in a region based on traffic flow data for that region. Illustrative embodiments further relate to a road side unit, RSU, configured for performing such method, particularly to a RSU comprising a control unit configured for performing such method. Illustrative embodiments further relate to a transportation vehicle configured for performing such method, particularly to a transportation vehicle comprising a control unit configured for performing such method. Illustrative embodiments further relate to a computer program for enabling a control unit to perform the disclosed method.

BRIEF DESCRIPTION OF THE DRAWINGS

Disclosed embodiments will be described in my detail with reference to the attached drawings in which.

DETAILED DESCRIPTION

Automotive applications and mobile communications become more and more entangled, particularly due to the increasing interest in autonomous driving that requires larger amounts of data when compared to conventional driving. These data amounts are provided partially by the transportation vehicle itself (i.e., by sensors thereof) and partially via an air interface. Via the air interface either a vehicle to vehicle, V2V, communication or a vehicle to everything, V2X, communication is carried out, the latter including communication with road side units, RSUs. Therein, V2V and V2X communication can be carried out either as point-to-point (unicast) communication or as point-to-multipoint (multicast/broadcast) communication.

Where V2X communication is carried out via a cellular mobile network, such as, e.g., a LTE or 5G communication network, it is referred to as cellular-V2X, C-V2X. The V2V and C-V2X communications can be carried out in a LTE or 5G network with sidelink carries at the PHY layer (PC5 sidelink) or based on WLAN communication according to IEEE 802.11p standard.

With an increasing amount of modern transportation vehicles using V2V and V2X communication, the number of users of these communication protocols is on the rise. Due to the user numbers and increasingly complex applications, the amount of transmitted data will rise continuously. However, due to limited bandwidth and data rate the increase in data might come along with a deterioration of channel quality and thus quality of service, QoS, of communication links.

However, particularly with respect to autonomous driving the QoS of the radio links might be directly related to the safety of the automated processes and hence the driver's safety. An example can be found in so-called "platooning", which is a cooperative driving maneuver that shall allow the participating transportation vehicles to form a high-density convoy with minimal spacing for reducing energy and fuel consumption of the individual transportation vehicles. In such platooning, a platoon leader might need to inform other platoon members of a required braking operation or the like via a unicast message. If such message is transmitted in a poor channel quality environment, the transmission might be prone to errors or delays causing decreased performance and risk.

WO 2018/111177 A1 discloses a method for adjusting a distance between transportation vehicles of a platoon based on an actual or predicted geographic position of the platoon as well as on additional information on road conditions, weather conditions or traffic conditions. However, V2V communication within or V2X communication of the platoon have not been considered.

Disclosed embodiments overcome or reduce at least some of the drawbacks of the prior art and to provide a method for predicting channel load that allows for the adaption of the driving operation of automatic transportation vehicles based on a predicted channel load.

According to an exemplary embodiment, a method for predicting channel load is provided that can be performed by either a transportation vehicle as described below or by a road side unit as described below. In a first operation of the method, a first channel quality information, CQI, is determined, wherein the first CQI is associated with a defined location and is further associated with a first time point. The first CQI may comprise the measurement of a received power of a signal received via a channel of a communication network, such as a cellular network or a WLAN network. The first CQI may further comprise information on an error rate of the communication, such as, e.g., a packet error loss rate or a bit error rate. The first channel quality information, CQI, may further be configured similarly to a Quality of Service (QoS) Class Identifier, QCI, or a channel quality indicator, CQI, according to LTE-A but is however not limited to such an exemplary embodiment.

The disclosed method further comprises the operation of predicting a traffic flow, particularly of predicting travel flow data, that is associated with the location and with a second time point that is subsequent to the first time point, i.e., that follows the first time point. Therein, predicting the travel flow with respect to the location and the second time point allows estimating (determining) a traffic situation that is present at the location and second time point. Therein, the traffic situation is mainly characterized by the amount of transportation vehicles that are located nearby the location at or around the second time point. However, the traffic situation may consider additional facets, e.g., traffic lights, as described in detail below.

In the method of the present disclosure, then a second quality channel information, CQI, is predicted (determined), wherein the second CQI is associated with the location and with the second time point and wherein the prediction is based on the first CQI as well as on the predicted traffic flow. Therein, the first CQI may be used as a baseline, i.e., a starting point, wherein changes to the CQI are predicted based on the travel flow prediction, e.g., based on an incoming amount and an outgoing amount of transportation vehicles. Also, the first CQI is associated with a traffic situation, e.g., a number of transportation vehicles at or around the location at or around the first time point. The first CQI may then be normalized based on the traffic situation, e.g., the number of transportation vehicles, at the location at the first time point. Then, a second CQI may be determined based on the traffic situation, e.g., the number of transportation vehicles, at the location at the second time point and the normalized first CQ (cross-multiplication). A more detailed description of predicting the traffic flow and the second CQI is given below.

In the method of the present disclosure, a message comprising the predicted second CQI, the location, and the second time point is selectively transmitted to at least one transportation vehicle, optionally to a plurality of transportation vehicles. Therein, the selection of whether or not transmitting the message to at least one transportation vehicle is based on the second CQI, e.g., the absolute value thereof. Where the second CQI comprise a scalar value, the determination whether to transmit the message may be carried out based on a numerical comparison of the scalar value of the second CQI with a threshold. Where the second CQI comprise information in form of a vector or a matrix, such determination may be carried out element-wise or based on a norm of the second CQI. The information on the second time point may be included an an absolute time value or in form of a duration with respect to an actual time (timestamp) of the message. Further, the information on the location may be included as a GPS coordinate.

The method of the present disclosure thus allows to transmit a message to at least one transportation vehicle for informing the transportation vehicle of a second CQI that was predicted for a location and for a future second time point. Based on such prediction, a receiving transportation vehicle can adapt its operations, particularly its automatic driving applications that usually rely on wireless data transmission and reception. The message may be transmitted to the transportation vehicle directly (V2V) or relayed via a base station of a mobile communication network or a road side unit. By selectively transmitting the second CQI, the disclosed method avoids channel congestion. Thus, by not transmitting a message comprising the second CQI in situations where the transmission of such a message is not required, channel congestion is avoided.

In a disclosed embodiment, the location is defined by a geographic coordinate and a predetermined area around the geographic coordinate. Therein, the geographic coordinate is optionally defined by a position at which the first CQI was measured. The predetermined area around the geographic coordinate is optionally predetermined, e.g., by setting a predetermined radius such as 500 m, 1 km or the like, around such position. Further, the predetermined area might depend on a velocity of a transportation vehicle while measuring the first CQI or might be based on multiple measurements of a transportation vehicle yielding the first CQI. In other words, the first CQI may itself apply rather to a region (area) than to a specific location. Further, such area (region) might also be indicated differently than by a location and a range about it, such as, e.g., by specifying the locations of a boundary of the area or by specifying an identifier of a base station of a communication network responsible for the coverage of that area. The area may also be defined by a grid element of a predefined grid or by using street information, referring to streets, crossings, etc.

The predetermined area about the location may be as well indicated in the message. Hence, if the second CQI is defined for an area (region) comprising the location, the transportation vehicle receiving the message will also be informed about the area to beneficially adapt its automatic driving applications with respect to the whole area. By defining the CQI for a region, the usability of the method may be increased and more vehicles benefit.

In an exemplary embodiment, the predetermined area about the location is determined or defined based on a propagation direction and a velocity for the location. Such trajectory and velocity for the location may be indicated in the message as well and/or may be determined based on the travel flow prediction for the location. Further, the predetermined area about the location is determined based on an identifier or a trajectory of at least one transportation vehicle associated with the travel flow prediction (the second location) and/or associated with the second CQI. In general, an area with critical CQI (i.e., above first and/or second threshold as defined below) is prone to be generated by moving clusters of transportation vehicles using a same communication network infrastructure. Hence, a (moving) critical area might be also associated with the positions of one or more of such transportation vehicles and by knowing the identifier of such transportation vehicle, an actual position thereof can be determined and, based on such actual position, a second CQI value can be predicted for a corresponding location, i.e., a location of the cluster at the second time point.

In a disclosed embodiment, the traffic flow data comprises a first number of transportation vehicles that is approaching the location in between the first time point and the second time point or within a defined time frame around the second time point and a second number of transportation vehicles that is departing from the location in between the first time point and the second time point or within a defined time frame around the second time point. Based on such numbers, i.e., an inflow and an outflow, of transportation vehicles, a change of a total of number of transportation vehicles associated with the location can be determined based on a continuity equation. Particularly, the operation of predicting the traffic flow data comprises: determining a first number of transportation vehicles entering the predetermined area between the first and second time point (or within a defined time frame around the second time point) and determining a second number of transportation vehicles leaving the predetermined area between the first and second time point (or within a defined time frame around the second time point). Further, the traffic flow data comprises a number of transportation vehicles that are at the location or that are proximate to the location at the second time point or in a predetermined time frame around the second time point. Based on such number of transportation vehicles the second CQI can be estimated for the location or area for the second time point.

In a further disclosed embodiment, the operation of predicting the traffic flow data comprises the operation of determining a propagation direction and/or velocity of at least one transportation vehicle, optionally of a plurality of transportation vehicles, based on sensor readings. Such sensor readings may be obtained by sensors as usually employed for distance measurements in transportation vehicles, such as, e.g., LIDAR, ultrasound or laser baser distance sensors. However, in the context of the present disclosure such sensor readings may be also obtained by a road side unit comprising such sensors. Additionally or alternatively, the operation of predicting the traffic flow data comprises the operation of determining a propagation direction and/or velocity of at least one transportation vehicle, optionally of a plurality of transportation vehicles based on at least one cooperative awareness message, CAM, optionally on a plurality of CAM, received from at least one transportation vehicle. Such CAM comprises information on the location and propagation direction of the transportation vehicle and thus allows predicting the future whereabouts of the transmitting transportation vehicle. Hence, traffic flow prediction can even be accomplished without performing actual sensor readings, which is beneficial in bad measurement conditions such as heavy rain, fog or snow. The information contained in CAM messages may be based on data obtained by the transmitting transportation vehicle itself, such as, e.g., GPS coordinates and traveling trajectories, velocity, etc. Particularly, sensor readings are combined with received CAM information to predict the traffic flow data in the method of the present disclosure with high precision.

Further, the prediction of the traffic flow data in the method of the present disclosure is further based on additional information associated with the location. Such additional information may comprise road information, which further characterized the infrastructure at the location. Such road information may specify that the location is an intersection (with or without traffic lights), a pedestrian crossing (with or without traffic lights), a railway crossing (with or without gates), or the like. Such road information may be derived from navigation information present in a transportation vehicle or can be derived from historic traffic flow data. Further, such road information comprise additional data, such as, e.g., on switching times of a traffic light, on closing times of a gate at a railway crossing, crossing times of trains at a railway crossing, or the like. Further, the additional information associated with the second location further comprise traffic information that further specifies an actual traffic scenario at or around the location. Such traffic information may specify that a traffic jam is occurring at or around the location or that an accident occurred at or around the location. Further, the traffic information comprise additional information that a road block or closure is occurring for another reason at or near the location. Based on such additional information, the traffic flow prediction may be adjusted, e.g., by considering dwelling times of incoming transportation vehicles at or around the location or by considering obstructions that prevent a flow of outgoing transportation vehicles to leave an area around the location or the like.

In the method of the present disclosure, the prediction of the second CQI is based on the prediction of the traffic flow data for the location and the second time point, particularly based on an estimate for a total number of transportation vehicles at or around the location at or around the second time point. Based on such number of transportation vehicles, the second CQI may be determined by assuming predetermined channel usage per transportation vehicle that is located at or around the position at or around the second time point. Therein, channel usage refers to the part of fraction of communication bandwidth of a channel that is occupied by a single transportation vehicle. Alternatively, the channel usage per transportation vehicle may be individually adapted for a transportation vehicle or for a group of transportation vehicles. Exemplarily, the channel usage per transportation vehicle may be determined for a group of transportation vehicles based on a category of the transportation vehicles of that group. Also, the channel usage per transportation vehicle may be determined for individual transportation vehicles based on a transmission history or data usage history of that transportation vehicle. Such information may be received via CAM messages received from the transportation vehicles. That is such adaption is suitably carried out in a traffic flow prediction based on CAM messages.

In a further disclosed embodiment, the message is broadcasted within a predetermined transmission range around the location. In other words, the message about a location or area with critical channel conditions is only shared on a predefined range (e.g., radius) around the location or area to further reduce the channel congestion. Particularly, the predetermined transmission range is therein determined based on a road class associated with the location. In other words, urban roads may be distinguished from highways, Autobahn, or the like and the transmission range is set based on the distinguished road class. Exemplarily, on roads with higher average travel speed, the transmission range is larger than for roads with lower average travel speed. Alternatively to setting a transmission range directly, a transmission power is adapted based on road class.

Further, in the method of the present disclosure an additional boundary condition exists for selectively transmitting the message to the at least other transportation vehicle in that the message is only transmitted within a predetermined distance around the location. By limiting the distance wherein transmission occurs, a transmission of the message is avoided at distances regions which are far away from the location, as a probability that receiving transportation vehicles actually cross the location to which the second CQI applies decreases with increasing distance. Particularly, the predetermined distance threshold is about 2 km, optionally about 3 km or about 5 km. Hence, the transmission of the second CQI is limited to a 5 km radius about the location (area).

In a further disclosed embodiment, the operation of selectively transmitting the message comprises the operation of transmitting the message, if the second CQI exceeds a predetermined first threshold, and the operation of not transmitting the message, if the second CQI is below the first threshold. In other words, the message is only transmitted when a predetermined criticality of channel quality is determined for the location (area). As set forth above, the first and second CQI optionally relates to a channel load and/or to a quality of service available via this channel. As further set forth above the channel may be one of a mobile bearer of a 4G or 5G LTE network or a WLAN bearer of a WLAN connection according to IEEE 802.11p standard. The disclosed method aims at decreasing channel congestion related to the transmission of service message. Hence, the second message is transmitted if the second CQI relates to a channel load of above 70% of channel capacity, 80% of channel capacity, or of above 90% channel capacity. Hence, transmission of messages is avoided if no critical channel quality is to be expected.

In addition to the first threshold, a second threshold may be utilized in the disclosed method. Therein, the second threshold may be below the first threshold and may apply to the first CQI. A disclosed embodiment thus comprises the operation of determining whether the first CQI exceeds one of the predetermined first and second threshold and the further operations of the method of predicting the traffic flow data and the second CQI are only carried out, when the first CQI exceeds the second threshold. In other words, if the first CQI does not already indicate a certain pre-criticality for the location/area, the prediction of traffic flow data and second CQI (channel load) is not performed at all. Further, if the first CQI already exceeds the first threshold as described above with respect to the second CQI, then optionally a message is transmitted to at least one other transportation vehicle, the message comprising the first CQI, the location, and the first time point. However, in such situation, the prediction operations may be performed and the message further comprises information on the second time point and the second CQI as described above.

In a disclosed embodiment, the message is a shared channel quality, SCQ, message configured to inform transportation vehicles that will pass a critical area with high channel load as described in detail in European patent application No. 19158381.4, the full content of which is hereby incorporated by reference. Further, the first message and/or the second message is a cooperative communication message, CCM, configured to comprise information on a channel as well as on surrounding structures that might have an impact on the channel quality as described in detail in European patent application No. 18184352.5, the full content of which is hereby incorporated by reference. However, for the disclosed method for predicting a channel load the format for transmitting the second CQI is rather irrelevant.

Another exemplary embodiment relates to a transportation vehicle comprising a (first) communication module is configured to communicate with another transportation vehicle and with at least one station of a communication network. The (first) communication module may comprise further components to enable such communication with another transportation vehicle (i.e., an identical or similar communication module of another transportation vehicle) in the mobile communication system. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. These components may further be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a (uniform) field array, etc.

The transportation vehicle of the present disclosure further comprises a plurality of first sensors that are configured for detecting a propagation direction and/or velocity of at least one other transportation vehicle, optionally of a plurality of other transportation vehicles. These sensors may be configured as common in the field for detecting distances between a transportation vehicles and another transportation vehicle or obstacles, e.g., by utilizing LIDAR technology, RADAR technology, ultrasound sensors or laser-based sensors. In addition to the sensors, the communication module of the transportation vehicle may be further configured to receive a CAM message from at least one other transportation vehicle that comprises the information on a propagation direction and/or velocity of that transportation vehicle. The transportation vehicle may further comprise second sensors that are configured for detecting at least one value that is associated with a state of the transportation vehicle itself, e.g., the velocity or propagation direction of the transportation vehicle or the like. The communication module may further be configured for transmitting a CAM message comprising such information to at least one other transportation vehicle.

The disclosed transportation vehicle further comprises a (first) control unit that is connected to the (first) communication module, particularly via respective interfaces, and that is configured to control the communication module to receive and transmit respective data. The (first) control unit is particularly configured to determine a first channel quality information, CQI, associated with a location and associated with a first time point. The (first) control unit is further configured to predict traffic flow data associated with the location and associated with a second time point subsequent to the first time point. This prediction may be based on sensor readings obtained by the transportation vehicle and/or based on information retrieved from at least one CAM message received by the transportation vehicle. The (first) control unit is also configured to predict a second CQI associated with the location and associated with the second time point based on the first CQI and the predicted traffic flow and to selectively transmit a message comprising the second CQI, the location, and the second time point to at least one transportation vehicle based on the second CQI, e.g., if the second CQI exceeds a predetermined first threshold.

Another exemplary embodiment relates to a road side unit, RSU, that is configured for performing the method of the present disclosure. The RSU comprises a (second) communication module is configured to communicate with at least one transportation vehicle and with at least one other station of a communication network. The (second) communication module may comprise further components to enable such communication with a transportation vehicle or another station in the mobile communication system. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. These components may further be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, etc.

The RSU of the present disclosure may comprise a plurality of first sensors that are configured for detecting a propagation direction and/or velocity of at least one transportation vehicle, optionally of a plurality of transportation vehicles. These sensors may be configured as common in the field for detecting distances between transportation vehicles, e.g., by utilizing LIDAR technology, RADAR technology, ultrasound sensors or laser-based sensors. The (second) communication module is further configured to receive a CAM message from at least one transportation vehicle that comprises information on a propagation direction and/or velocity of that transportation vehicle.

The RSU further comprises a (second) control unit that is connected to the (second) communication module, particularly via respective interfaces, and that is configured to control the (second) communication module to receive and transmit respective data. The (second) control unit is particularly configured to determine a first channel quality information, CQI, associated with a location and associated with a first time point. The (second) control unit is further configured to predict traffic flow data associated with the location and associated with a second time point subsequent to the first time point. This prediction may be based on sensor readings obtained by the RSU and/or based on information retrieved from at least one CAM message received by the RSU. The (second) control unit is further configured to predict a second CQI associated with the location and associated with the second time point based on the first CQI and the predicted traffic flow and to selectively transmit a message comprising the second CQI, the location, and the second time point to at least one transportation vehicle based on the second CQI, e.g., if the second CQI exceeds a predetermined first threshold.

Another disclosed embodiment relates to a computer program comprising instructions which, when the program is executed by a control unit of a transportation vehicle or a RSU, cause the control unit to carry out a method for predicting channel load as set forth above.

Reference will now be made in detail to exemplary embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these exemplary embodiments are provided solely as examples for fully conveying the embodiments and features of the present disclosure to those skilled in the art.

Accordingly, processes, elements, and techniques that are not considered necessary to those having ordinary skill in the art for a complete understanding of the embodiments and features of the present disclosed may not be described. At the same time, within the drawings, the relative sizes of elements, layers, and regions may be exaggerated for clarity.

As used herein, the term "and/or" includes any and all combinations of one or more of the associated listed items. Further, the use of "may" when describing exemplary embodiments refers to "one or more exemplary embodiments." Further, in the following description of exemplary embodiments, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

As used herein, term as "substantially", and "about" are used as terms of approximation and not as terms of degree, and are intended to account for the inherent deviations in measured or calculated values that would be recognized by those of ordinary skill in the art. However, if the term "substantially" is used in combination with a feature expressed using a numeric value, the term "substantially" denotes a range of +/−5% of the value centered on the value.

Figure 1:
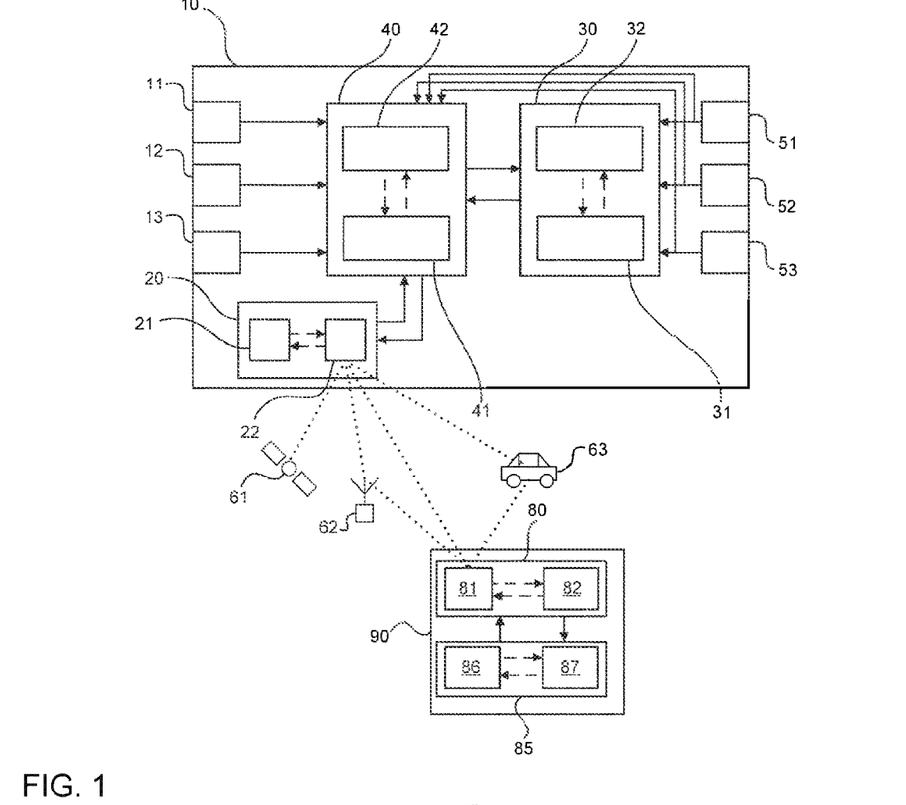
FIG. 1 schematically illustrates a system for performing the disclosed method.

FIG. 1 schematically illustrates an exemplary system for performing the disclosed method, the system comprising a transportation vehicle 10 and a road side unit, RSU, 90. The transportation vehicle 10 may comprise a combustion, electric or hybrid motor and comprises a multiple primary sensors, particularly a first sensor 11, a second sensor 12, and a third sensor 13. The primary sensors 11, 12, 13 are configured for detecting environmental information of the transportation vehicle and comprise, e.g., a camera for detecting images of a road upfront the transportation vehicle 10, distance sensors, such as, e.g., ultrasound-based sensors or LIDAR-based sensors, etc. The primary sensors 11, 12, 13 transmit the detected signals to a first control unit 40 of transportation vehicle 10.

The transportation vehicle 10 further comprises a plurality of secondary sensors, particularly a fourth sensor 51, a fifth sensor 52, and a sixth sensor 53. The secondary sensors 51, 52, 53 are configured for detecting information regarding the transportation vehicle 10 itself, particularly data regrading an actual position and motion state of the transportation vehicle 10. The secondary sensors 51, 52, 53 thus optionally comprise velocity sensors, acceleration sensors, tilt sensors, or the like. The secondary signals transmit the detected signals to the first control unit 40 of the transportation vehicle 10.

The transportation vehicle 10 further comprises a first communication module 20 with a memory and one or more transponders 22. The transponders 22 might be configured as radio, WLAN, GPS and/or BLUETOOTH® transponder or the like. The transponder 22 communicates with an internal memory 21 of the first communication module 20, optionally via a suitable data bus. The first communication module 20 is configured to perform V2V and (C-)V2X communication. Internally, the first communication module 20 communicates with the first control unit 40.

The first communication module 20 is adapted for communicating messages according to the WLAN p communication system (IEEE 802.11p) and/or according to a LTE-V mode 4 communication system. Further, the first communication module 20 is configured to detect signals that are suitable for determining a channel load on one of the communication channels used by the module 20. Particularly, the communication system is configured to communicate with a GPS satellite 61, with a base station 62 of a mobile communication network, and with other transportation vehicles 63, particularly with alike communication modules of other transportation vehicles 63. The first communication module 20 is further configured to communicate with a second communication module 80, particularly a transponder thereof, of a road side unit 90.

The transportation vehicle 10 further comprises a driving system 30 that is configured for performing fully or partially autonomous driving of the transportation vehicle 10, particularly for longitudinal and lateral control thereof. The driving system 30 comprises a navigation module 32 that is configured to determine a navigation route between a starting point and an end point input by a user. The driving system further comprises an internal memory 31, e.g., for map material, that communicates with the navigation module 32, e.g., via a suitable data bus. At least part of the secondary sensors 51, 52, 53 transmit their signals directly to the driving system 30, particularly including the actual position and movement information of the transportation vehicle 10.

The transportation vehicle 10 further comprises the first control unit 40 that is configured for performing the disclosed method as set forth in detail below. For performing this task and others the first control unit 40 comprises an internal memory 41 and a CPU 42 that communicate with each other via a suitable data bus. Above that the control unit 40 communicates with at least the primary sensors 11, 12, 13, the secondary sensors 51, 52, 53, the communication module 20 und the driving system 30, e.g., via one or more CAN, SPI, or other suitable connections.

The road side unit 90 of the system comprises the second communication module 80. The second communication module 80 comprises at least one transponder 81 for performing the physical communication via at least one physical channel, such as, e.g., a radio, WLAN, GPS and/or BLUETOOTH® transponder or the like. Further, the first communication module 20 is configured to detect signals that are suitable for determining a channel load on one of the used communication channels. The transponder 81 communicates with an internal memory 82 of the second communication module 80, optionally via a suitable data bus. The internal memory 82 may store communication related information, such as cell identifiers.

The second communication module 80 is adapted for communicating messages according to the WLAN p communication system (IEEE 802.11p) and/or according to a LTE-V mode 4 communication system. Further, the second communication module 80 is configured to detect signals that are suitable for determining a channel load on one of the communication channels used by the module 80. Particularly, the communication module 80 is configured to communicate with a base station 62 of a mobile communication network, with transportation vehicles 10, 63 and particularly with the first communication modules 20 of transportation vehicles 10, 63.

The road side unit 90 further comprises a second control unit 85 that is configured for performing the disclosed method. The second control unit 85 comprises an internal memory 86 and a CPU 87 that communicate with each other via a suitable data bus. The second control unit 85 is configured to control the second communication module 80.

Figure 2:
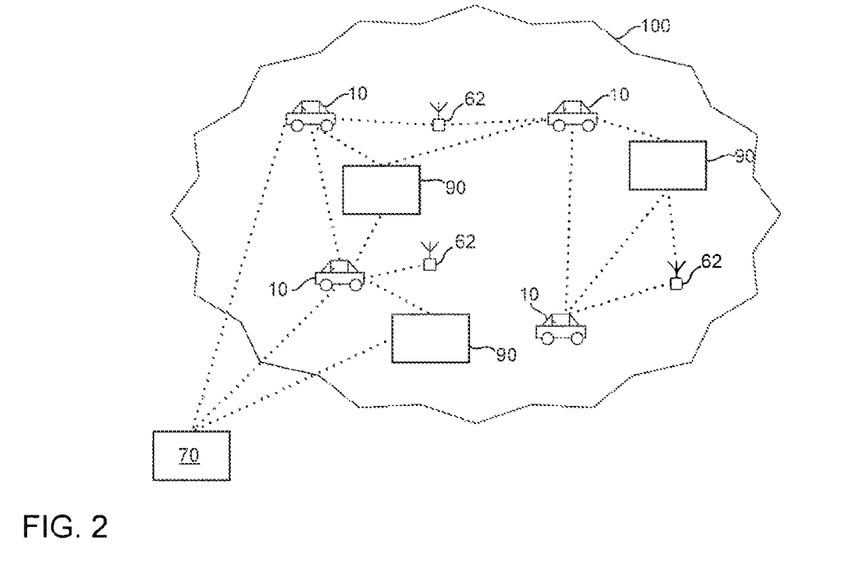
FIG. 2 schematically illustrates a smart environment for performing the disclosed method comprising the system as of FIG. 1, base stations of a mobile communication network, and a manufacturer server.

FIG. 2 schematically illustrates a smart environment for performing the disclosed method comprising transportation vehicles 10 and road side unit 90 as of FIG. 1, base stations 62 of a mobile communication network and a server 70 operated by a transportation vehicle manufacturer.

In the system as shown in FIG. 2 communication, i.e., transmission, reception or both, takes place among transportation vehicles 10 directly and/or between transportation vehicles 10 and a network component, particularly a base station 62, a road side unit 90, and/or an application or back end server 70. The communication thus either utilizes a mobile communication system, vehicle-to-vehicle, V2V, communication or vehicle-to-infrastructure, V2X, communication. Therein, the base stations 62 are usually operated by a network operator of a mobile communication network, while the road side units 90 might be operated by a network operator, by a transportation vehicle manufacturer or a by service partner of a manufacturer. Further, the road side units 90 communicate with the server 70 that might also communicate directly with transportation vehicles 10.

The mobile communication system used for the V2V and/or the V2X communication may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Figure 3:
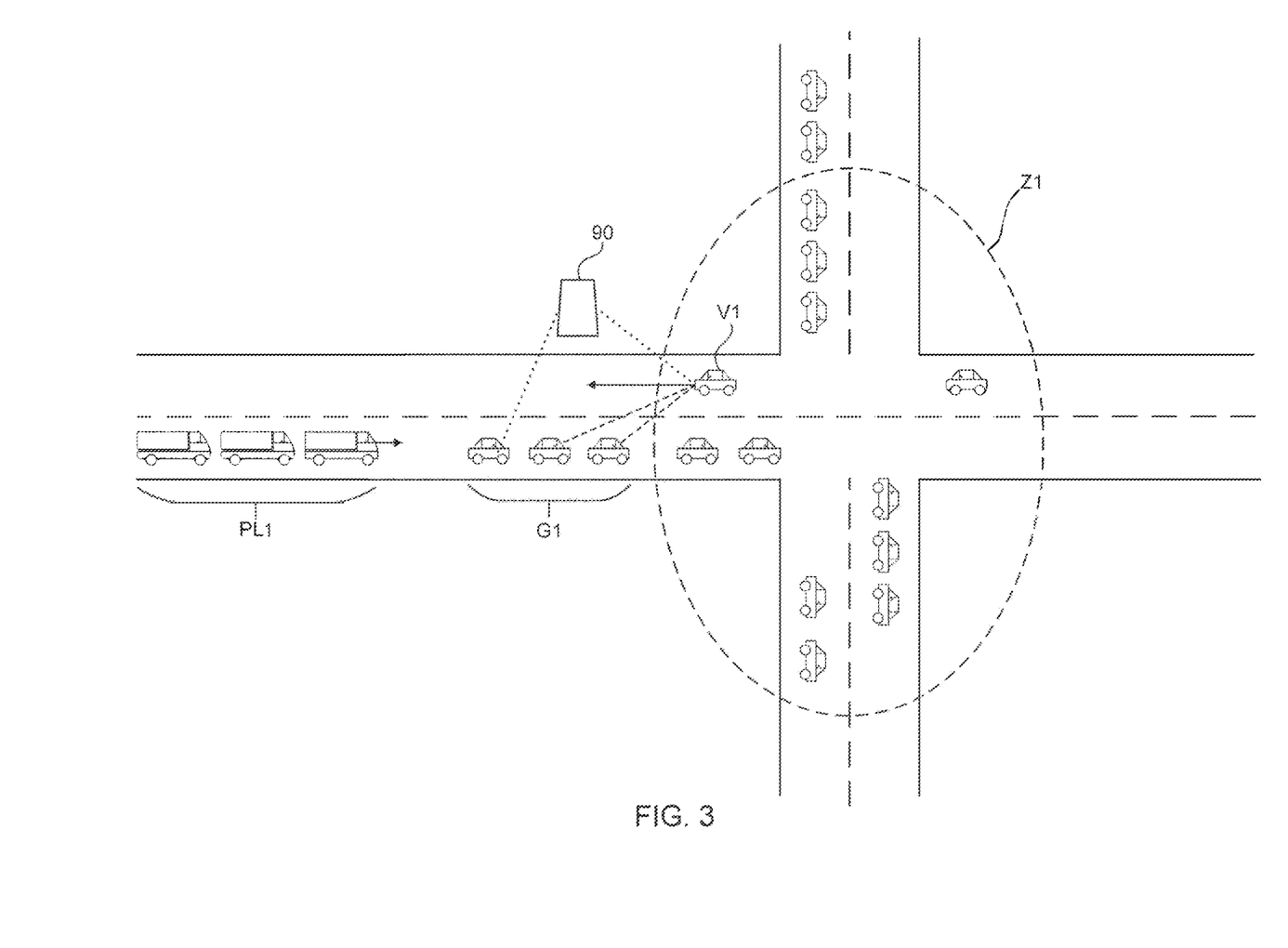
FIG. 3 illustrates an application case of the disclosed methods.

FIG. 3 illustrates an application case of a disclosed method, particularly of a method for predicting channel load according to an exemplary embodiment.

In the illustrated embodiment, an area Z1 around an intersection has an almost critical channel load at a first time point. Particularly, a first transportation vehicle V1 measures a first CQI indicating a channel load of approximately 69% at a first time point, while passing area Z1. A first threshold for detecting an area with critical area is set to 70% channel load, the first transportation vehicle V1 does not broadcast a message with the first CQI to other transportation vehicles. However, as a second threshold for detecting a pre-critical area is set to 60% channel load, the first transportation vehicle V1 determines the area Z1 to be a pre-critical area and performs the following predictions.

The first transportation vehicle is predicting traffic flow data associated with the first region and with a second time point subsequent the first time point. Therein, the first transportation vehicle considers information received from via CAM messages from transportation vehicles already being in first region Z1 and further considers additional road information indicating a traffic light at the intersection. Further, the first transportation vehicle detects further transportation vehicles of a first group G1 of transportation vehicles that is approaching the first area Z1 based on sensor readings of a LIDAR sensor system utilized by the first transportation vehicle V1. These distance and propagation measurements are indicated in FIG. 3 by dashed lines emanating from the first transportation vehicle V1. Additionally, the first transportation vehicle V1 receives another CAM message from a last transportation vehicle of the first group G1 that is relayed from this transportation vehicle via a road side unit 90 as described above with respect to FIG. 1 to first transportation vehicle V1.

Based on the information on the dwelling time of the transportation vehicles within the first region and the number of incoming transportation vehicles of the first group G1, the first transportation vehicle is able to predict a number of transportation vehicles within the first region at the second time point. Based on this prediction and the assumption of a constant channel usage (channel bandwidth usage) per transportation vehicle, the first transportation vehicle further predicts a second CQI for the second time point that indicates a channel load of 71% for the second time point. As the predicted channel load associated with the second CQI is above the first threshold of 70%, the first transportation vehicle V1 then broadcasts a message comprising the second CQI and information on the first area Z1 and on the second time point.

The first transportation vehicle V1 thus informs oncoming transportation vehicles/platoons within a predetermined range around its actual position of its predicted estimation of channel parameters. Exemplarily, the message is received by a first platoon PL1 that is approaching the first transportation vehicle V1 and first region Z1. Based on the message received from the first transportation vehicle V1, the transportation vehicles of the first platoon PL1 are able to predict a channel quality in the first region Z1 at the second time point based on the second CQI and can thus adapt their platooning application parameters, e.g., by increasing the distance between the platoon members. Hence, by the method of the present disclosure problems with V2X functions such as platooning can be effectively avoided.

The electronic or electric devices and/or any other relevant devices or components according to disclosed embodiments described herein, except those described explicitly as hardware, may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may comprise metallization, e.g., surface metallizations and/or pins, and/or may comprise conductive polymers or ceramics. Further electrical energy might be transmitted via wireless connections, e.g., using electromagnetic radiation and/or light. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

A person of skill in the art should recognize that the functionality of various computing devices may be combined or integrated into a single computing device, or the functionality of a particular computing device may be distributed across one or more other computing devices without departing from the scope of the exemplary embodiments. Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly defined so.

REFERENCE SIGNS 10 transportation vehicle
11 first sensor
12 second sensor
13 third sensor
20 communication module
21 memory
22 transceiver
30 driving system
31 memory
32 CPU
40 control unit
41 memory
42 CPU
51 fourth sensor
52 fifth sensor
53 sixth sensor
61 GPS satellite
62 base station
63 other transportation vehicle
70 backend server
90 road side unit
80 second communication module
81 transponder
82 internal memory
85 second control unit
86 internal memory
87 CPU
V1 first passenger transportation vehicle
V2 second passenger transportation vehicle
G1 first group of transportation vehicles
PL1 first platoon
Z1 critical area

The invention claimed is:

1. A method for predicting channel load, the method comprising:
   determining a first channel quality information (CQI) associated with a location and a first time point;
   predicting traffic flow data associated with the location and a second time point subsequent to the first time point;
   predicting a second CQI associated with the location and the second time point based on the first CQI and the predicted traffic flow; and
   selectively transmitting a message comprising the second CQI, the location, and the second time point to at least one transportation vehicle based on the second CQI.

2. The method of claim 1, wherein the location is defined by a geographic coordinate and a predetermined area around the geographic coordinate.

3. The method of claim 2, wherein the predetermined area is indicated in the message and/or wherein the area is predetermined based on a trajectory and/or an identifier of a transportation vehicle associated with the location and/or the second CQI.

4. The method of claim 1, wherein predicting the traffic flow data comprises determining a first number of transportation vehicles entering the area between the first and second time point and determining a second number of transportation vehicles leaving the area between the first and second time point.

5. The method of claim 1, wherein predicting the traffic flow data comprises determining a propagation direction and/or velocity of a transportation vehicle based on sensor readings and/or based on a cooperative awareness message (CAM).

6. The method of claim 1, wherein the prediction of the traffic flow data is further based on road information and/or traffic information associated with the location.

7. The method of claim 1, wherein the prediction of the second CQI comprises assuming predetermined channel usage per transportation vehicle located at or around the position at or around the second time point.

8. The method of claim 1, wherein the message is broadcasted within a predetermined transmission range around the location.

9. The method of claim 8, wherein the predetermined transmission range is determined based on a road class associated with the location.

10. The method of claim 1, wherein the message is transmitted in response to the second CQI exceeding a predetermined first threshold and the message is not transmitted in response to the second CQI being below the first threshold.

11. The method of claim 1, further comprising:
determining whether the first CQI exceeds one of a predetermined first and second threshold; and
predicting the traffic flow data and the second CQI, in response to the first CQI exceeding the second threshold, and/or
transmitting a message comprising the first CQI, the location, and the first time point to at least one transportation vehicle in response to the first CQI exceeding the first threshold.

12. The method of claim 1, wherein the message is a shared channel quality (SCQ) message or a cooperative communication message (CCM).

13. A transportation vehicle comprising:
a communication module to communicate with another transportation vehicle and with a station of a communication network;
a plurality of first sensors for detecting a propagation direction and/or velocity of another transportation vehicle; and
a control unit configured to determine a first channel quality information (CQI) associated with a location and a first time point, predict traffic flow data associated with the location and a second time point subsequent to the first time point, predict a second CQI associated with the location and the second time point based on the first CQI and the predicted traffic flow, and selectively transmit a message comprising the second CQI, the location, and the second time point to at least one transportation vehicle based on the second CQI.

14. A road side unit comprising:
a communication module configured to communicate with a transportation vehicle and with another station of a communication network; and
a control unit configured to determine a first channel quality information (CQI) associated with a location and a first time point, predict traffic flow data associated with the location and a second time point subsequent to the first time point, predict a second CQI associated with the location and the second time point based on the first CQI and the predicted traffic flow, and selectively transmit a message comprising the second CQI, the location, and the second time point to at least one transportation vehicle based on the second CQI.

15. A non-transitory computer readable medium including computer program comprising instructions which, when the program is executed by a control unit of a transportation vehicle, cause the control unit to determine a first channel quality information(CQI) associated with a location and a first time point, predict traffic flow data associated with the location and a second time point subsequent to the first time point, predict a second CQI associated with the location and the second time point based on the first CQI and the predicted traffic flow, and selectively transmit a message comprising the second CQI, the location, and the second time point to at least one transportation vehicle based on the second CQI.

* * * * *